Dec. 29, 1936.　　　F. G. CLARK　　　2,066,067
COMBINATION CHURN AND BUTTER WORKER
Filed July 17, 1935　　2 Sheets-Sheet 1
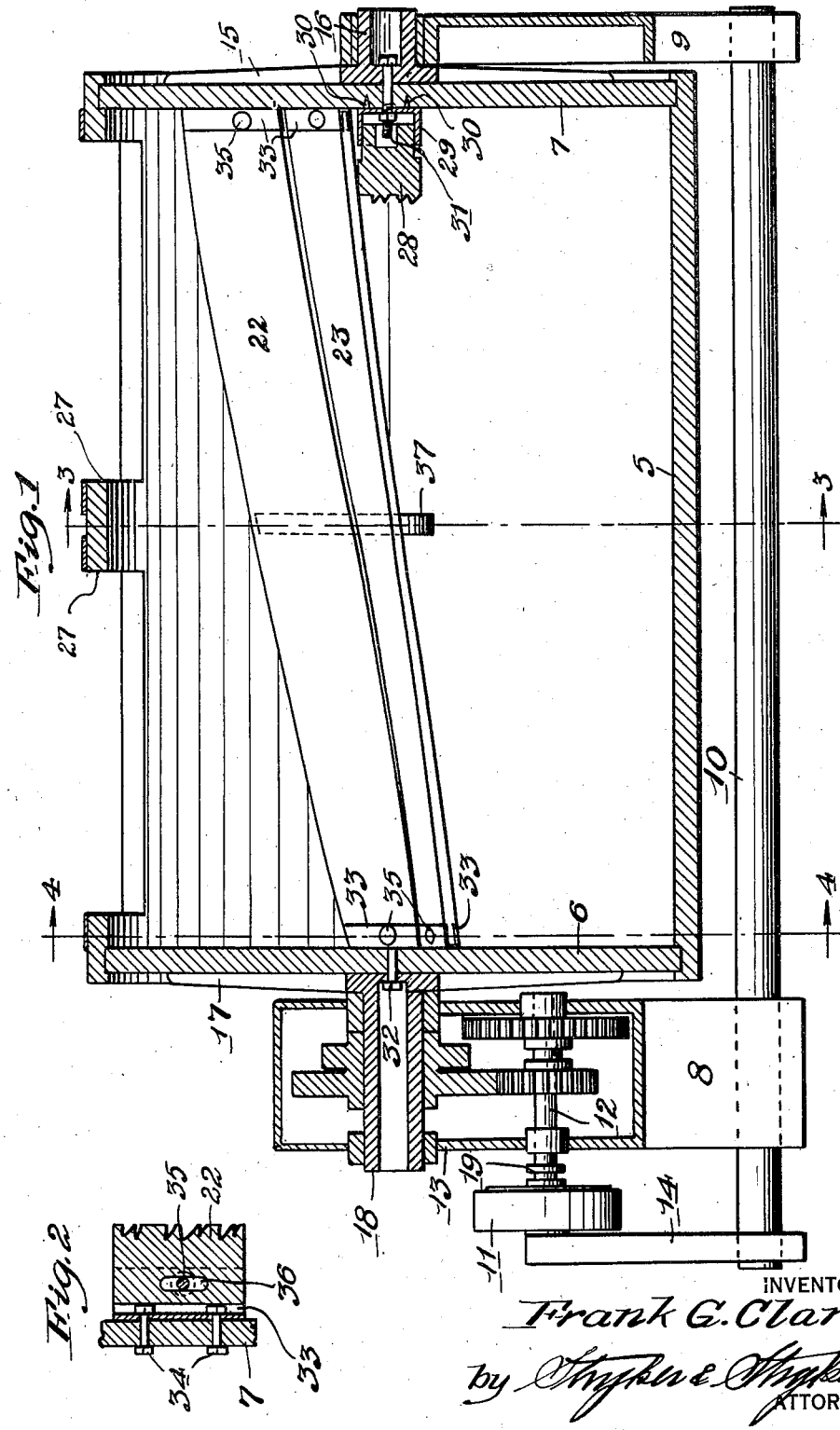
INVENTOR
Frank G. Clark
by Stryker & Stryker
ATTORNEYS Dec. 29, 1936.  F. G. CLARK  2,066,067
COMBINATION CHURN AND BUTTER WORKER
Filed July 17, 1935   2 Sheets-Sheet 2
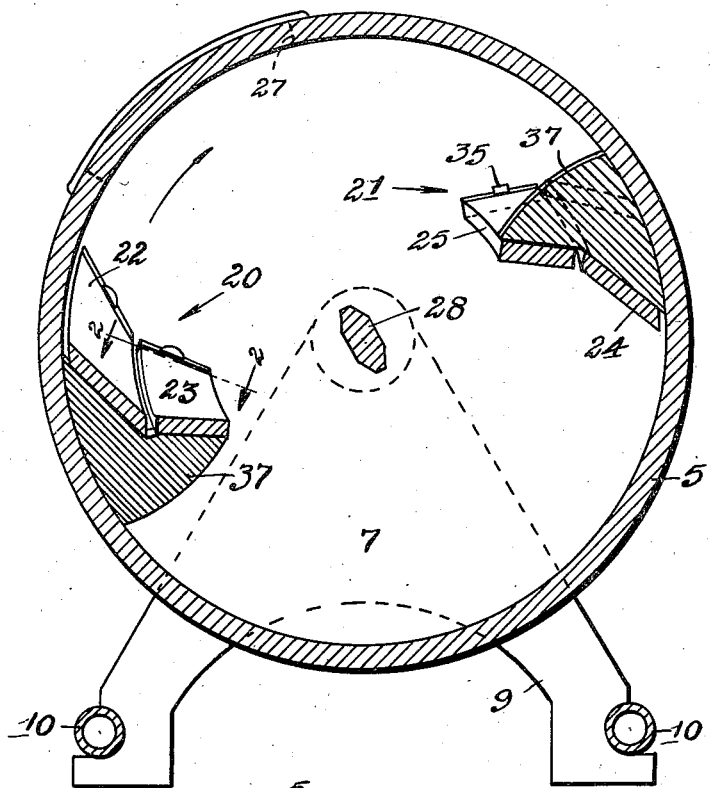
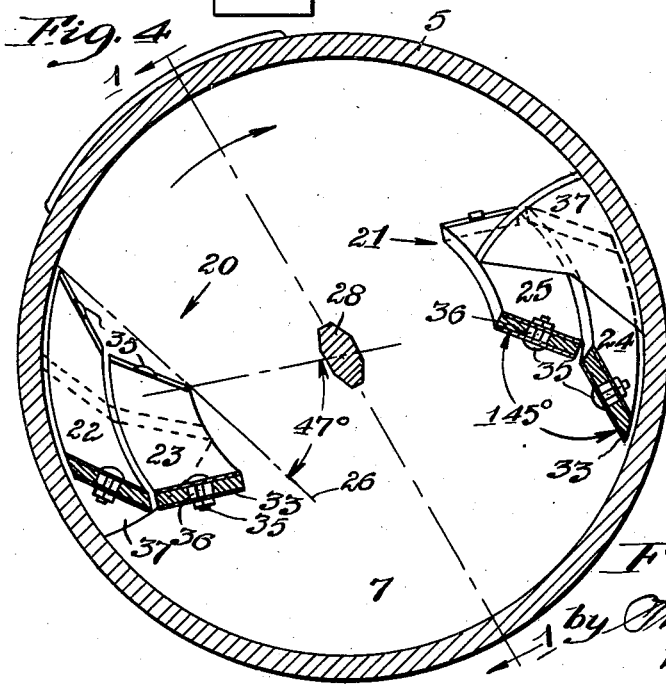
INVENTOR
Frank G. Clark
by Stryker & Stryker
ATTORNEYS Patented Dec. 29, 1936

2,066,067

UNITED STATES PATENT OFFICE 2,066,067

COMBINATION CHURN AND BUTTER WORKER

Frank G. Clark, Minneapolis, Minn., assignor to Crane Company of Minnesota, St. Paul, Minn., a corporation of Minnesota Application July 17, 1935, Serial No. 31,811

9 Claims. (Cl. 259—81)

It is an object of this invention to provide a combined churn and butter worker having a novel and efficient arrangement of stationary shelves in a rotary, cylindrical container whereby the quality of the butter is improved and the churn is greatly simplified and reduced in price as compared with churns having power-driven butter working rolls.

A particular object is to provide in a cylindrical churn a pair of oppositely disposed shelves extending from end to end of the churn and of such spiral form and pitch as to work the butter by twisting and rolling action while distributing the load longitudinally of the churn and preventing accumulations of butter in any part or zone within the churn.

A further object is to provide in a churn and butter worker a novel pair of fixed shelves having their inner edges, from end to end, uniformly spaced from the axis of the churn so that the working of the butter is accomplished by turning and twisting motion of the mass rather than by dropping it from a substantial height.

Other objects will appear and be more fully pointed out in the following specification and claims.

Referring to the drawings:

Figure 1 is an axial section through the churn taken on the line 1—1 of Fig. 4, a portion of the center bar being removed to show parts otherwise concealed;

Fig. 2 is a fragmentary section through one of the shelf members and end wall of the churn, taken on the line 2—2 of Fig. 3;

Fig. 3 is a vertical section taken on the line 3—3 of Fig. 1, and

Fig. 4 is a section taken on the line 4—4 of Fig. 1.

My improved churn is provided with a cylindrical container or body 5 having end walls 6 and 7 supported to rotate about its axis between standards 8 and 9. These standards are rigidly connected together by a pair of tubular frame members 10. Power for rotating the churn is applied to a pulley 11 mounted on a horizontal shaft 12 and this shaft has bearings in a gear housing 13 and in a standard 14. Secured to the end 7 of the churn is a spider 15 integral with an axial shaft 16 revolubly mounted in a bearing in the standard 9. At the opposite end, a spider 17 has the integral, axial shaft 18 projecting therefrom and revolubly mounted in bearings in the gear housing 13. Change speed gearing for driving the churn at speeds suitable for churning and for butter working is mounted in the housing 13 and a clutch 19 is provided on the shaft 12 to operatively connect the drive pulley 11 to said shaft.

Within the churn body and extending longitudinally thereof are shelves indicated generally by the numerals 20 and 21. The shelf 20 comprises two angularly disposed planks or members 22 and 23 and the shelf 21 comprises similar members 24 and 25. The members 22 and 23 are disposed edge to edge and obliquely to each other so that the front or upper face of the shelf 20, as seen in Figs. 3 and 4, is dish shaped or concave. The angle between the front faces of the members 22 and 23 in planes perpendicular to the axis of the churn is preferably about 145 degrees, as indicated in Fig. 4 and the member 22 is wider than the member 23 in the proportion of about 5 to 4. The inner extremity of the shelf 20 is located on a line approximately midway between the inner periphery of the churn body and the axis of the churn. As indicated in Fig. 4, if a straight line 26 be drawn through the inner extremity of the front face of the shelf 20 and outer extremity of said face extended to the churn periphery, the angle between the line 26 and the radius to the inner extremity of said face is approximately 47 degrees. Each of the members 22 and 23 has a uniform spiral twist so that these angles are maintained throughout the length of the shelf 20 in planes perpendicular to the axis. The pitch or angle of the shelf 20 relative to elements of the cylindrical body 5 is 1 to 5 or approximately equal to 11 degrees.

The shelf 21 has its members 24 and 25 similarly constructed and arranged, except that the pitch is opposite to that of the shelf 20 and the shelves are located diametrically opposite each other at the transverse center plane or section illustrated in Fig. 3. By this arrangement the far end of the shelf 20 (as seen in Fig. 4) is the leading one, whereas, the near end of the shelf 21 leads in the direction of rotation of the body 5. The approximate angles and proportions of the shelves 20 and 21 and their members 22, 23, 24 and 25 hereinbefore described have been found to produce excellent results and may be said to be critical for a churn of the common commercial size, which is 55½ inches in interior diameter and 6 to 8 feet in length between the end walls 6 and 7.

To allow access to the interior of the churn, a pair of door openings 27 are formed in the periphery of the churn body a few inches above the leading end of the shelf 20, as seen in Fig. 3, suitable closures (not shown) being provided for the openings 27. The direction of rotation is as indicated by the arrows in Figs. 3 and 4.

A stationary bar 28 extends axially within the churn body from end to end and is preferably placed broadside to the inner extremities of the shelf members 23 and 25. The ends of the bar 28 are secured to the ends of the churn by the device illustrated at the right of Fig. 1. Each end of the bar has a ferrule or cap 29 slidably and snugly fitting thereon. Projecting from the end surface of this cap is a pair of teeth 30 adapted to be impressed into the end wall 7. A bolt 31 extends through the end wall 7 of the churn and through an axial bore in the spider 15 so that the head of the bolt is accessible in the bore of the shaft 16 and the inner end of the bolt is threaded in a nut secured to the inner surface of the cap 29. When the bar 28 is to be removed from the churn the cap 29 may be moved along the bar 28 to withdraw the teeth 30 from the end wall 7, while the bolt 31 is withdrawn from the nut in said cap. The end of the bar 28 adjacent to the wall 6 of the churn is similarly secured by a bolt 32 accessible through the bore of the shaft 18.

To adjustably secure the shelf members 22, 23, 24 and 25 to the end walls of the churn body I provide metal caps 33 severally fitting over the ends of said members. A pair of bolts 34 (Fig. 2) connect each cap 33 to the end of the churn and a bolt 35 extends transversely through perforations in each cap 33 and through an elongated slot 36 formed in the shelf member. By adjusting the bolts 35 in the slots 36 the shelf members may be clamped in any adjusted position within the limits permitted by the slots 36. I prefer to space the members of the shelves 20 and 21 apart sufficiently to allow for cleaning and sterilizing of the edge surfaces and also to space the members 22 and 24 a short distance from the inner periphery of the churn body for like reasons. However, some creameries prefer to have the shelf members in edge to edge abutment to each other and snugly against the inner periphery of the churn and my arrangement of the bolts 35 and cap members 33 permits this and other desirable adjustments of the shelf members. Each of the shelves 20 and 21 is supported intermediate its ends on a bracket 37.

*Operation*

For churning, the body 5 containing the cream, is rotated at the higher speed and the shelves 20 and 21 aid in the agitation. After the churning and withdrawal of the buttermilk, the butter is worked by rotating the body 5 at the slower speed and in the direction indicated by the arrows in Figs. 3 and 4. The working is produced by the shelves 20 and 21 which successively pick up the mass of butter and work it by a twisting and slight dropping action. The shelves are so proportioned that the butter, in a long, uniform, furrow-like body, is carried up the left side of the churn as seen in Fig. 4 on one of the shelves and when the upper end of that shelf reaches a position a little higher than that illustrated in Fig. 4 the high end of the mass of butter rolls off of the shelf (without separation from the remaining mass) while the mass is twisted. The working by this turning or twisting movement continues as the rotation continues so that the mass progressively rolls from the shelf to the bottom of the churn. It is then picked up by the other shelf, the leading end of which is at the opposite end of the churn from that of the first shelf and the action is repeated by twisting and rolling the mass of butter in the reverse direction or hand. The bar 28 aids in maintaining a uniform distribution of the butter longitudinally of the churn by retaining the mass in place on the upwardly moving shelf, until it has reached the proper height and by breaking up any mass that is carried too high before it rolls off the shelf.

It will be evident that the inner extremities of the two shelves are located, from end to end, at a substantially uniform distance from the bar 28 and axis of the churn. This prevents the sudden dropping of the entire elongated mass of butter from the edge of the upwardly moving shelf and insures the progressive rolling off movement of the mass accompanied by the desired twisting action. It has been found that the resulting butter is of high quality and uniform consistency and the churn is not subjected to the severe shocks produced by dropping of the entire mass of butter from a shelf simultaneously.

Having described my invention, what I claim as new and desire to protect by Letters Patent is:

1. A combined churn and butter worker comprising, a cylindrical body, means supporting said body for rotation about its axis and with its axis disposed horizontally, a single pair of shelves extending spirally, substantially from end to end of said body within the same, the hand or pitch of one of said shelves being in the reverse direction from that of the other shelf and the inner edges of said shelves, from end to end, being spaced substantially uniformly from the axis of said body, and means for rotating said body at speeds suitable for churning and for working butter therein.

2. A combined churn and butter worker comprising, a cylindrical body, means supporting said body for rotation about its axis and with its axis disposed horizontally, a pair of oppositely disposed shelves extending spirally and substantially from end to end of said body, the hand or pitch of one of said shelves being in the reverse direction from that of the other, the front face of said shelves being oblique to the radii of said body intersecting such faces, the outer edges of said shelves being the leading edges and the inner edges of said shelves being disposed approximately midway between the inner periphery and axis of said body and means for rotating said body at speeds suitable for churning and for working butter therein.

3. A combined churn and butter worker comprising, a cylindrical body, means supporting said body for rotation about its axis and with its axis disposed horizontally, a pair of oppositely disposed shelves extending spirally and substantially from end to end of said body, the hand or pitch of one of said shelves being in the reverse direction from that of the other shelf and the inner edges of said shelves, from end to end, being spaced substantially uniformly from the axis of said body, each shelf being formed from a plurality of planks disposed edge to edge and obliquely to each other and means for rotating said body at speeds suitable for churning and for working butter therein.

4. A combined churn and butter worker having in combination, a rotary, cylindrical body mounted with its axis horizontal and a pair of oppositely disposed shelves mounted within said body and each extending from end to end thereof and spirally along the inner periphery thereof, said shelves having opposite pitches and each having a dished front face extending to a line substantially uniformly spaced between the periphery and axis of said body.

5. A combined churn and butter worker comprising, a cylindrical body, means supporting said body for rotation about its axis and with its axis disposed horizontally, a pair of shelves extending spirally, substantially from end to end of said body within the same, the hand or pitch of one of said shelves being in the reverse direction from that of the other shelf and the inner edges of said shelves, from end to end, being spaced substantially uniformly from the axis of said body and a bar extending axially of said body and in such spaced relation to said inner edges as to coact therewith in retaining butter on said shelves.

6. In a churn and butter worker, a cylindrical container, means supporting said container for rotation about its axis and with its axis disposed horizontally and a pair of oppositely disposed shelves extending spirally and substantially from end to end along the inner periphery of said container, the hand or pitch of one of said shelves being in the reverse direction from that of the other shelf and the inner edges of said shelves, from end to end, being spaced substantially uniformly from the axis of said container, each shelf comprising two angularly disposed planks spaced apart and from the periphery of said container.

7. A combined churn and butter worker comprising, a cylindrical body, means supporting said body for rotation about its axis and with its axis disposed horizontally, a pair of oppositely disposed shelves extending spirally and substantially from end to end of said body, the hand or pitch of one of said shelves being in the reverse direction from that of the other shelf and the leading face of each shelf being concave and having its inner edge arranged to trail its outer edge and means for rotating said body at speeds suitable for churning and for working butter therein.

8. A churn and butter worker having in combination, a rotary, cylindrical body mounted with its axis horizontal, a pair of oppositely disposed shelves mounted within said body and each extending from end to end thereof and spirally along the inner periphery thereof, said shelves having opposite pitches and each having a dished front face extending to a line substantially uniformly spaced from the axis of said body, each shelf comprising two elongated members disposed obliquely to each other and edge to edge and means securing the ends of said members to the ends of said body.

9. A churn and butter worker having in combination, a cylindrical body mounted with its axis horizontal, a pair of oppositely disposed shelves within said body and each extending from end to end thereof and spirally along the periphery thereof, said shelves having oppositely directed pitches equal to about eleven degrees and each having a dished front face extending uniformly to a line substantially midway between the periphery and axis of said body.

FRANK G. CLARK.